Aug. 2, 1960  H. GANG  2,947,477
VALUE SELECTION CONTROL FOR CALCULATING MACHINES
Filed March 26, 1957  9 Sheets-Sheet 1

INVENTOR
*HERMAN GANG*
BY
Norman Friedman
ATTORNEY

Aug. 2, 1960  H. GANG  2,947,477
VALUE SELECTION CONTROL FOR CALCULATING MACHINES
Filed March 26, 1957  9 Sheets-Sheet 2

INVENTOR
*HERMAN GANG*
BY Norman Friedman
ATTORNEY

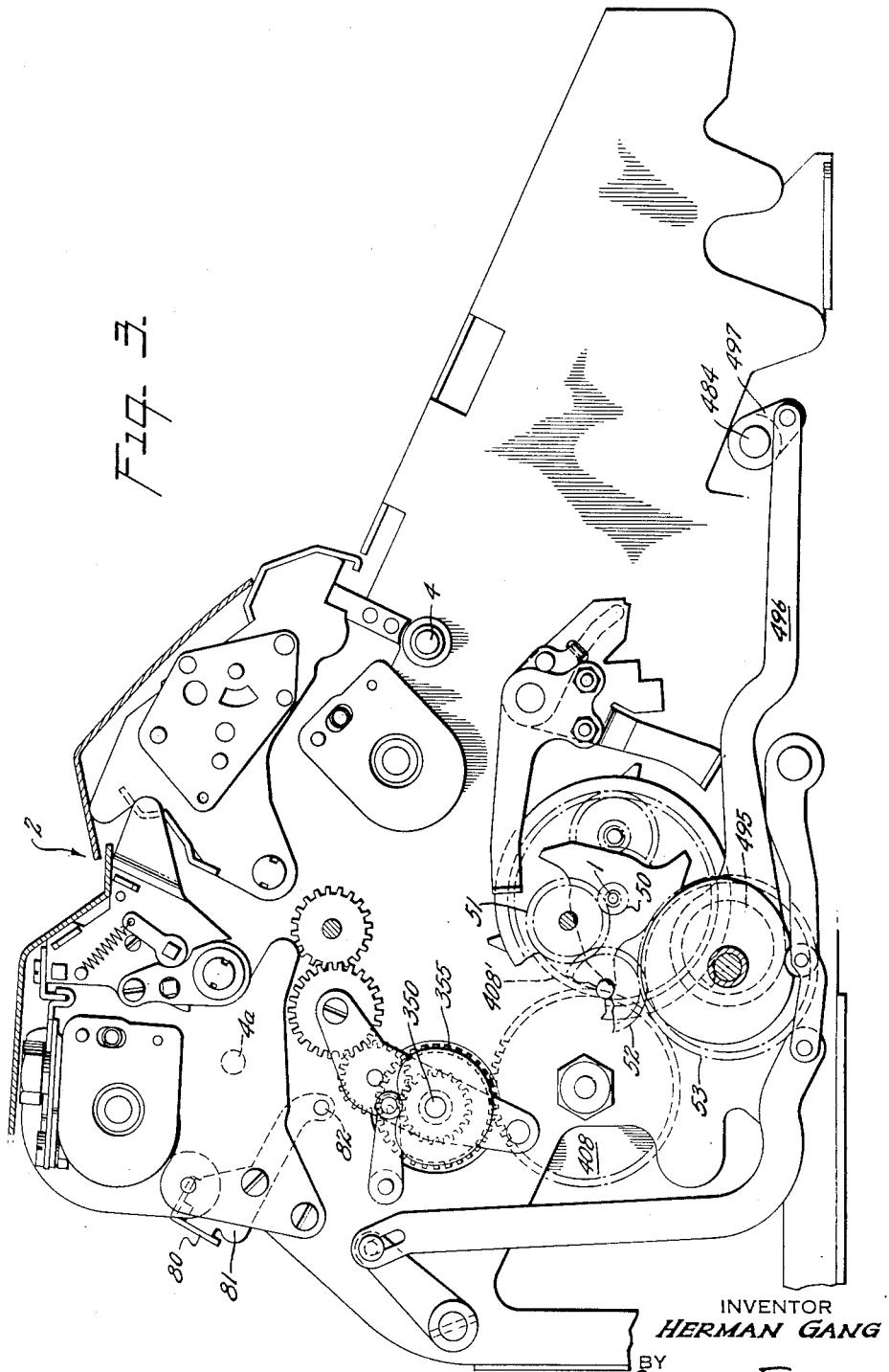

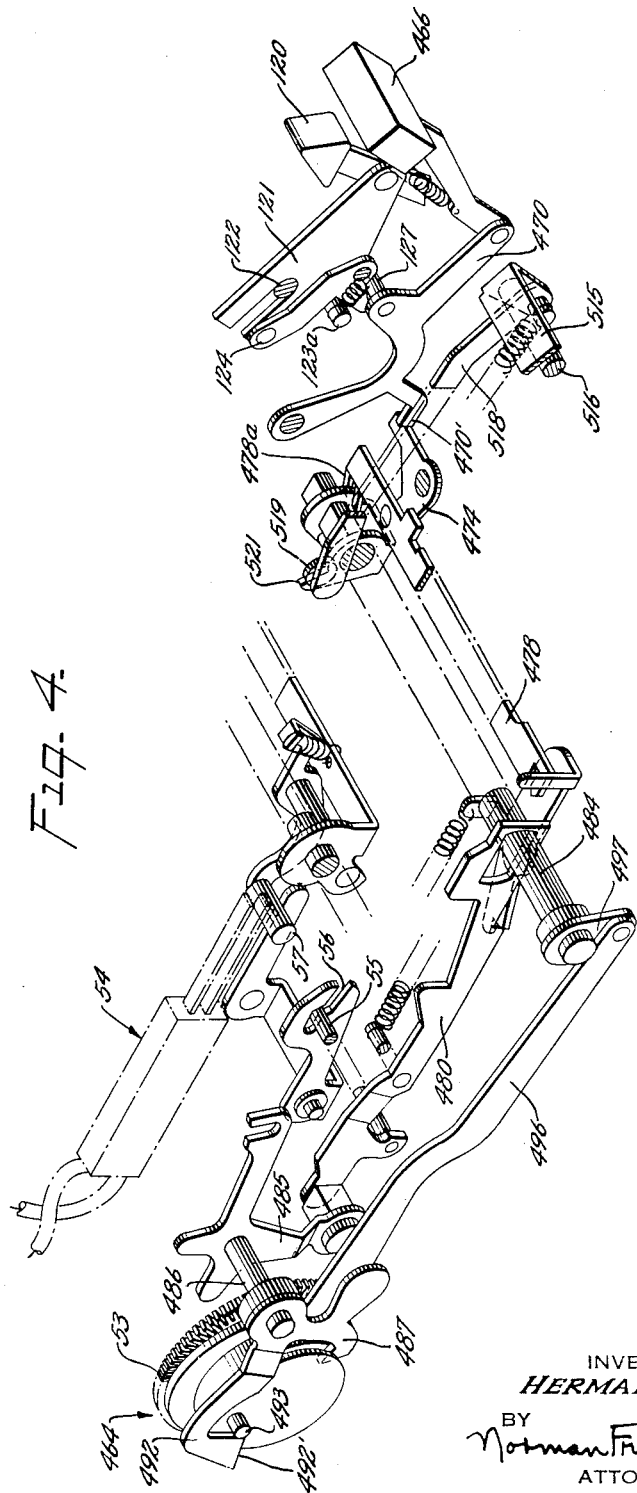>

Aug. 2, 1960
H. GANG
2,947,477
VALUE SELECTION CONTROL FOR CALCULATING MACHINES
Filed March 26, 1957
9 Sheets-Sheet 5
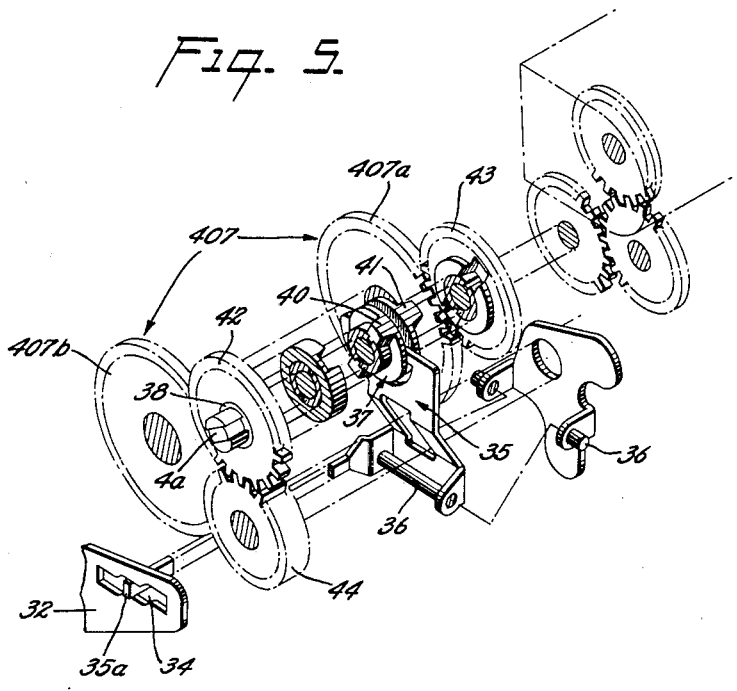
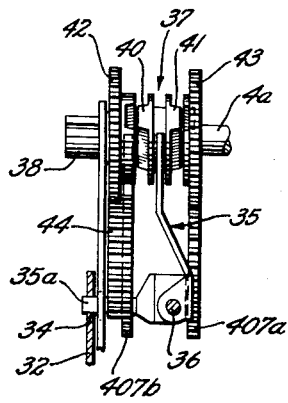
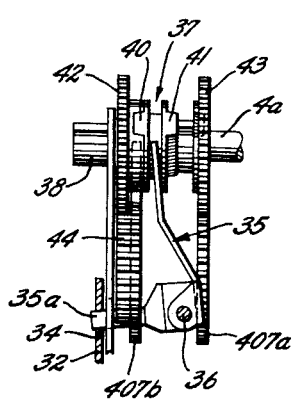
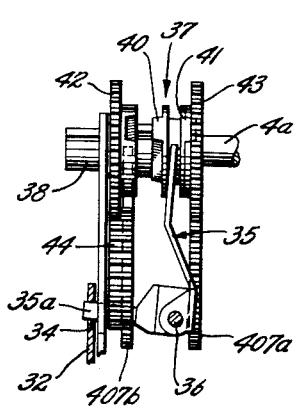
INVENTOR
*HERMAN GANG*
BY
*Norman Friedman*
ATTORNEY Aug. 2, 1960
H. GANG
2,947,477
VALUE SELECTION CONTROL FOR CALCULATING MACHINES
Filed March 26, 1957
9 Sheets-Sheet 6
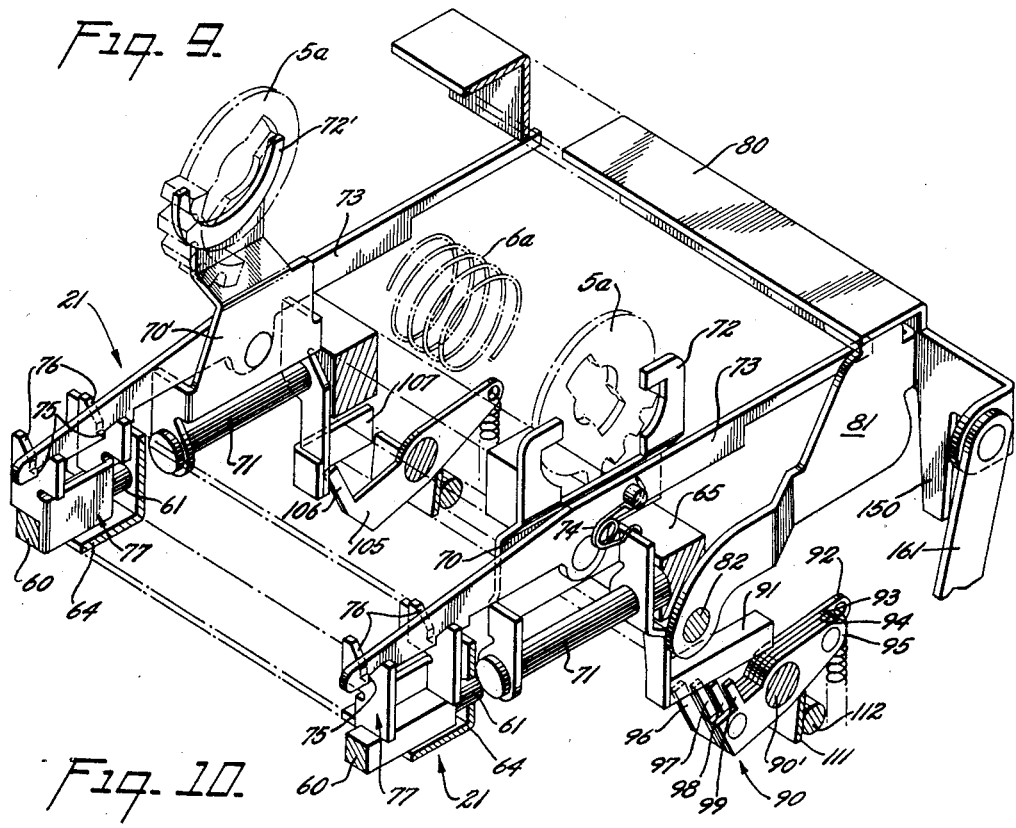
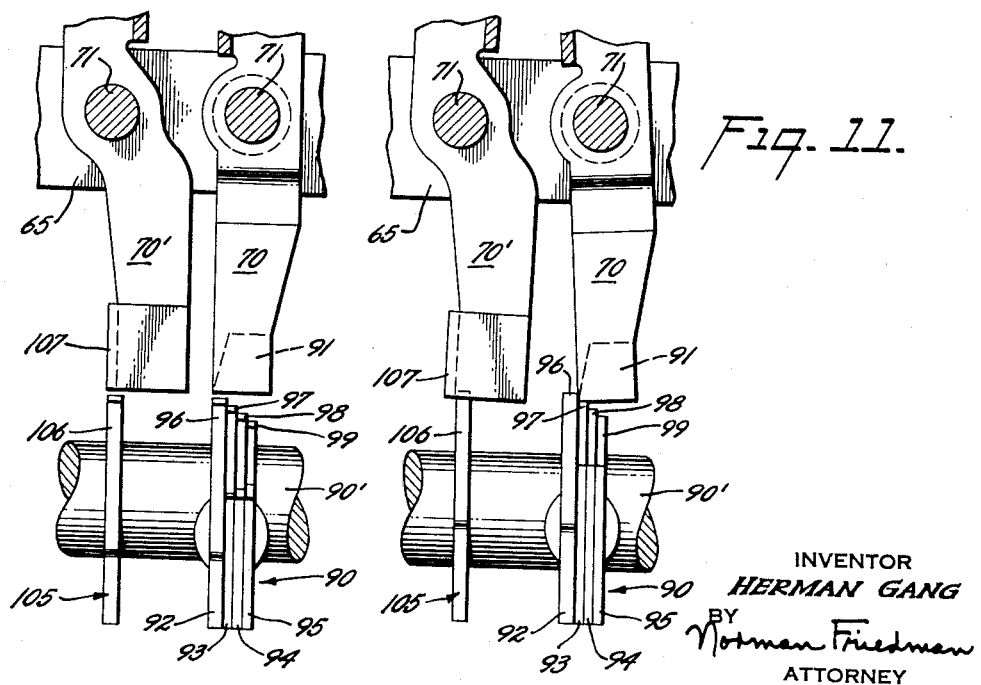
INVENTOR
*HERMAN GANG*
BY
*Norman Friedman*
ATTORNEY

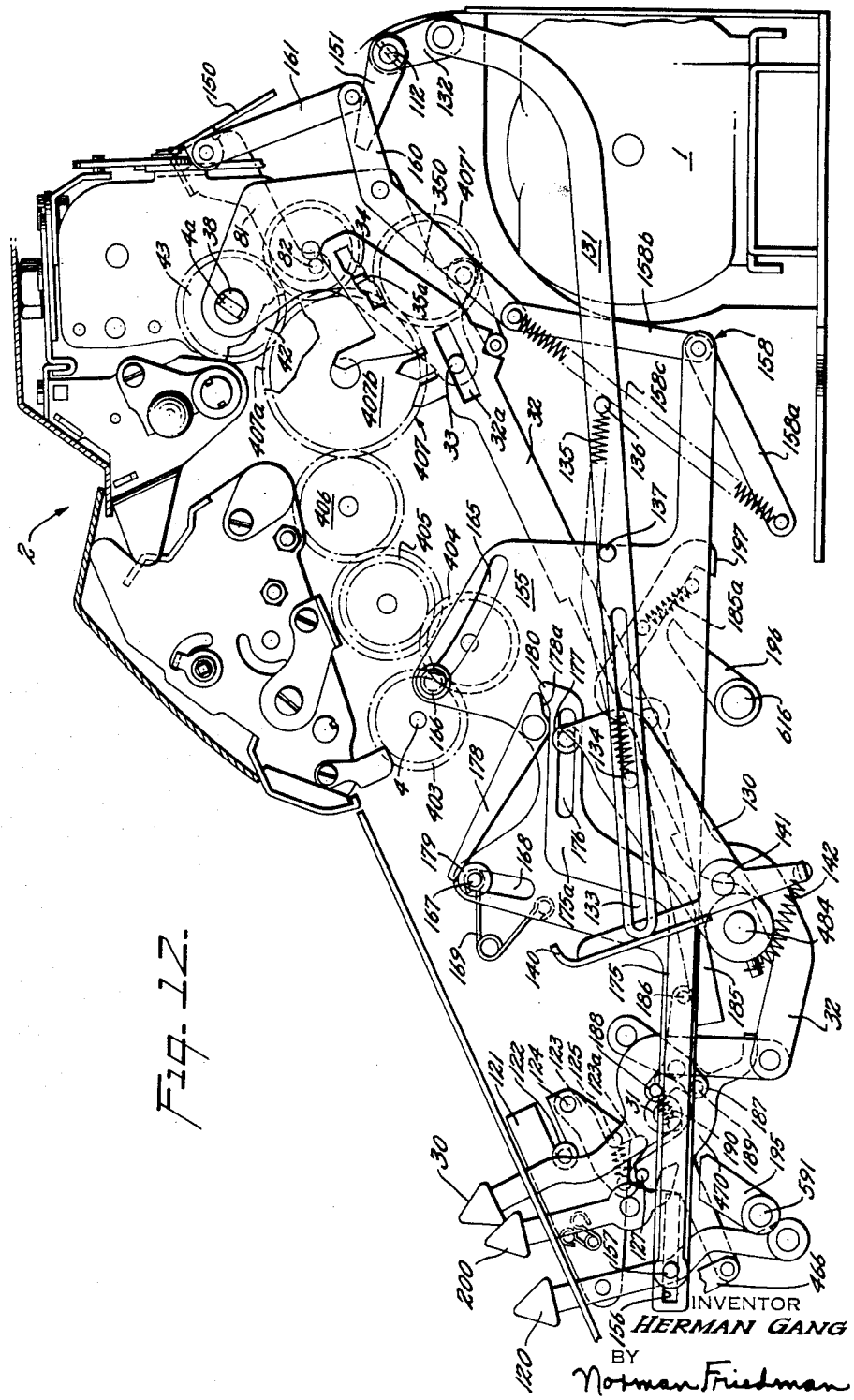

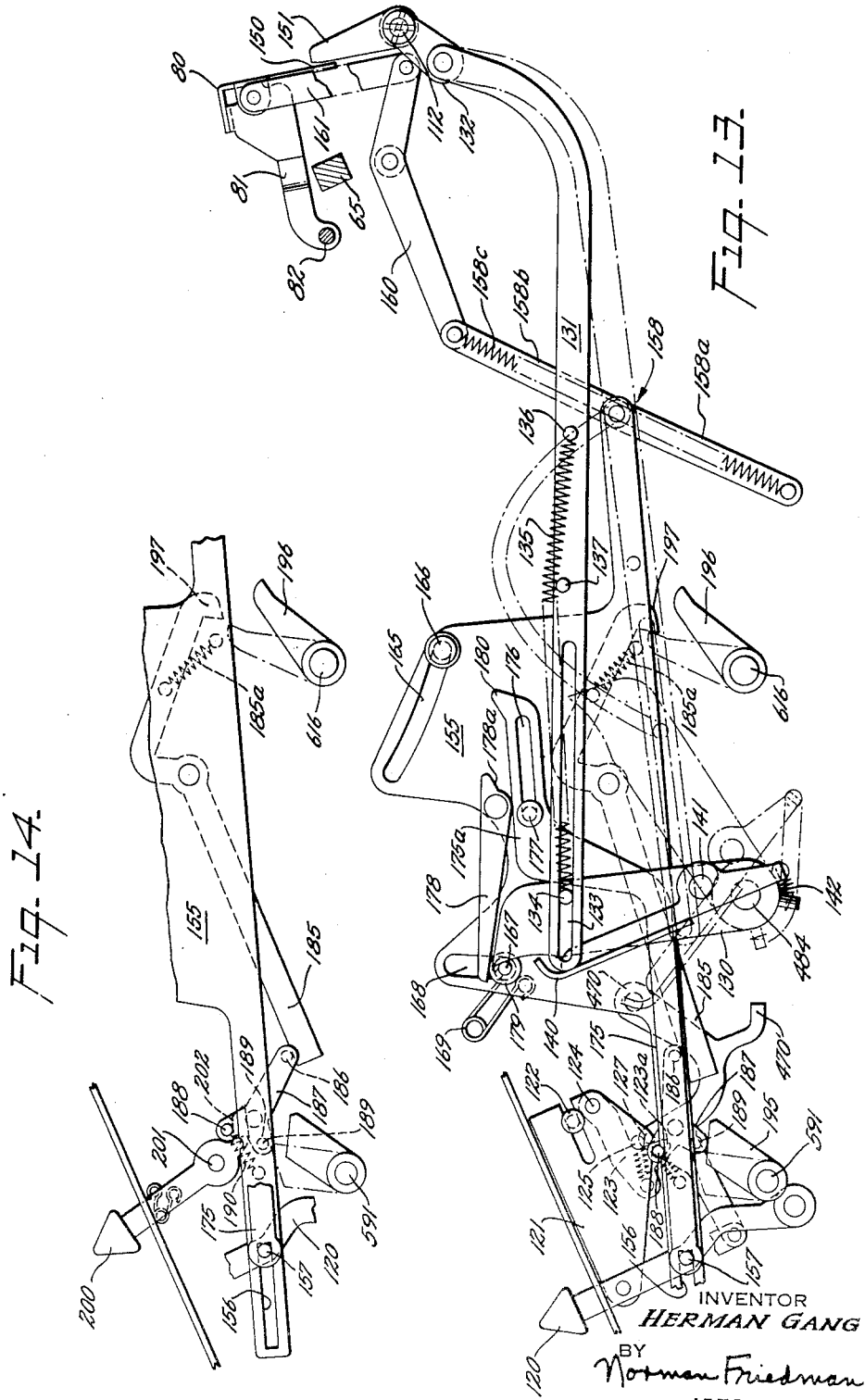

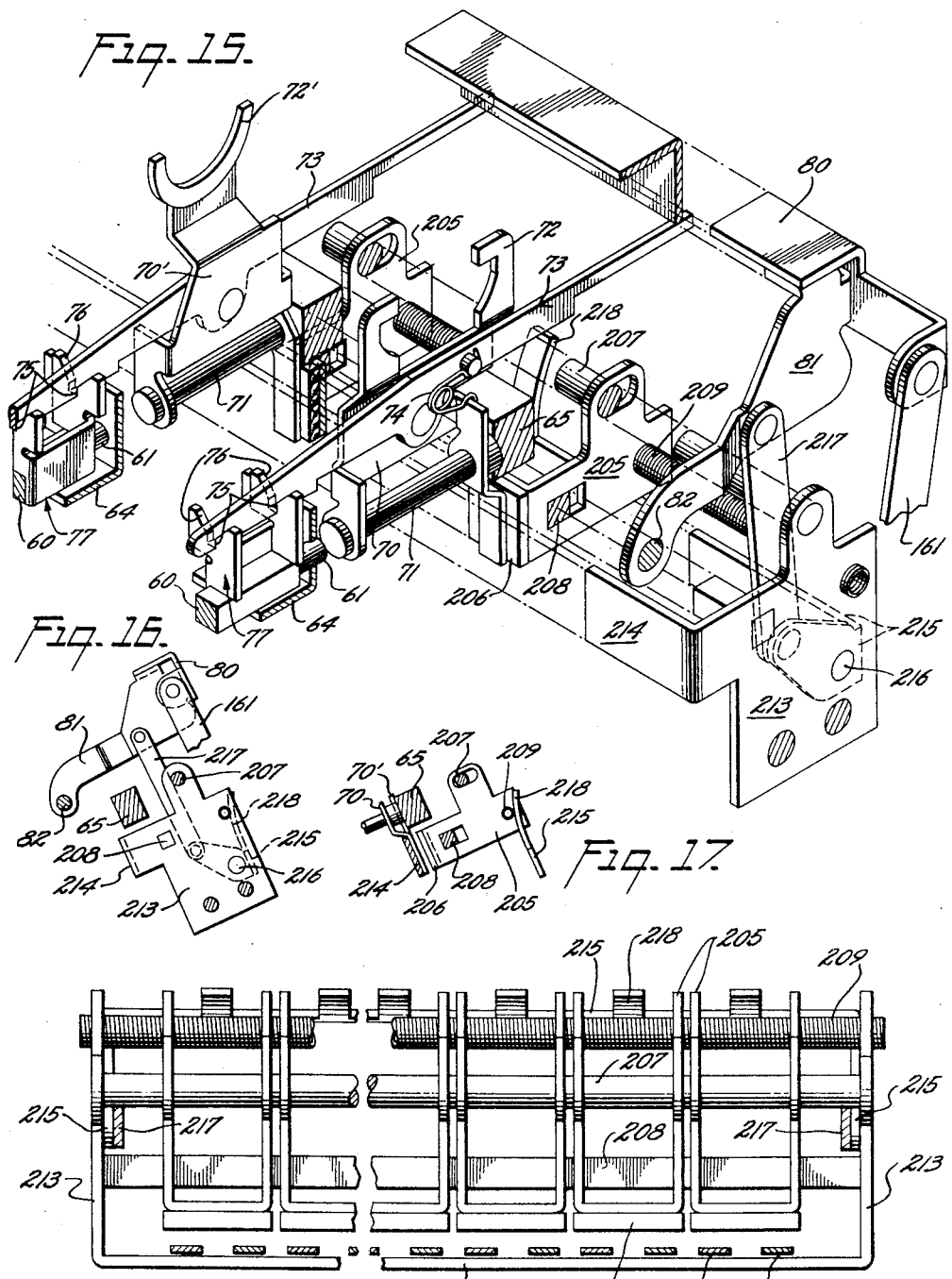

United States Patent Office 2,947,477
Patented Aug. 2, 1960

2,947,477

VALUE SELECTION CONTROL FOR CALCULATING MACHINES

Herman Gang, Morris Plains, N.J., assignor to Monroe Calculating Machine Company, Orange, N.J., a corporation of Delaware Filed Mar. 26, 1957, Ser. No. 648,660

14 Claims. (Cl. 235—79)

The present invention pertains to value selection control means for calculating machines of the type which are provided with two accumulator registers.

In one well known and commercially available form, such machines generally include separate digital actuating means for each of the accumulator registers, and common digital value selection means (including a keyboard) for controlling differential operations of both actuating means. Digital value setting of the common selection means serves to control duplicate value registration by both actuating means whereby identical values are simultaneously entered into both registers upon cycling of the machine.

According to the present invention, means is provided whereby selectively the actuating means of one of the accumulator registers of a dual register calculating machine can be locked at any digital setting to which it has been adjusted by the selection mechanism, and then divorced from the control of the selection mechanism while the other actuating means remains under the control thereof. Upon clearing of the selection mechanism, new values can be set therein and employed to control subsequent calculating operations. The invention makes possible the simultaneous performance of two different calculating operations, since the respective actuating means of the two accumulator registers can be set to different digital values.

It is therefore a primary object of the invention to provide novel digital value selection mechanism for dual register calculating machines.

It is a further object to provide common selection mechanism for the respective value entry means of a dual register calculating machine wherein the value entry means of one of the registers can selectively be divorced from the control of the common selection mechanism.

It is another object to provide common selection mechanism for the respective value entry means of a dual register calculating machine wherein the value entry means of one of the registers can be locked at any digital value setting and divorced from the control of the selection mechanism.

According to a feature of the invention, mechanism is provided whereby the locking and divorcing means, after operation thereof, is automatically disabled in response to the termination of a subsequent calculating program.

In the preferred form of the invention as herein disclosed, the locking and divorcing mechanism is selectively operated in response to initiation of a keyboard clear cycle whereby in a single cycle of machine operation, locking and divorcing will be effected and the selection mechanism will be cleared for entry of new values.

In the drawings:

Fig. 3 is a left side elevation showing the drive mechanism of the machine.

Fig. 4 is an exploded perspective view showing the keyboard clearing mechanism.

Fig. 5 is an exploded rear perspective view of the mechanism for controlling the sign of registration of the rear accumulator register relative to the front accumulator register.

Figs. 6, 7, and 8 are fragmentary rear elevation views of the mechanism of Fig. 5 in various positions of adjustment.

Fig. 9 is an enlarged fragmentary exploded perspective view showing the adjustable connections between the selection mechanism and rear actuators, and the fingers for locking the rear actuators in digitally adjusted position.

Fig. 10 is a fragmentary front elevation showing the lower portion of the digital adjusting members for the rear actuators, and the corresponding locking fingers in normal ineffective position.

Fig. 11 is a view similar to Fig. 10 showing the adjusting members locked in a digitally adjusted position by the locking fingers.

Fig. 12 is a right side elevation of the machine showing in normal ineffective position the mechanism for controlling operation of the locking fingers and of the selection connection to the rear actuators.

Fig. 13 is a view showing the mechanism of Fig. 12 in operated position.

Fig. 14 is a view showing the selectively operable linkage for controlling automatic normalizing of the mechanism of Figs. 12 and 13.

Fig. 15 is a view similar to Fig. 9 showing a modified form of digital locking means for the rear actuators.

Fig. 16 is a right side elevation of the mechanism of Fig. 15.

Fig. 17 is a fragmentary side section taken through Fig. 15.

Fig. 18 is a top plan view of the mechanism of Fig. 15.

*General description*

For the purposes of the present disclosure, the invention is shown and described as embodied in a dual accumulator register calculating machine capable of performing the four rules of arithmetic, such machine being of the type set forth in my Patents No. 2,617,594 issued November 11, 1952, and No. 2,531,207 issued November 21, 1950, to which reference is made for details not herein disclosed. It should be understood, however, that the present disclosure is intended to be illustrative only, since the invention can readily be applied to other types of calculating machines provided with a plurality of accumulator registers.

Figure 1:
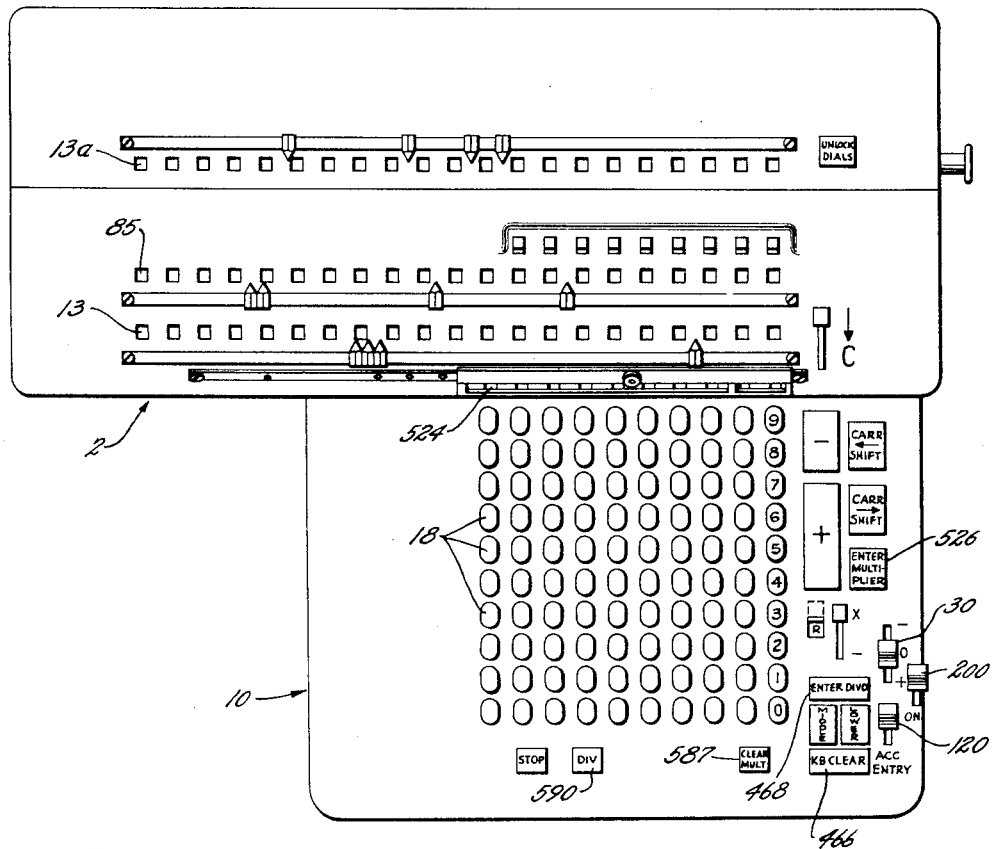
Fig. 1 is a top plan view of a calculating machine in which the present invention is incorporated.
Figure 2:
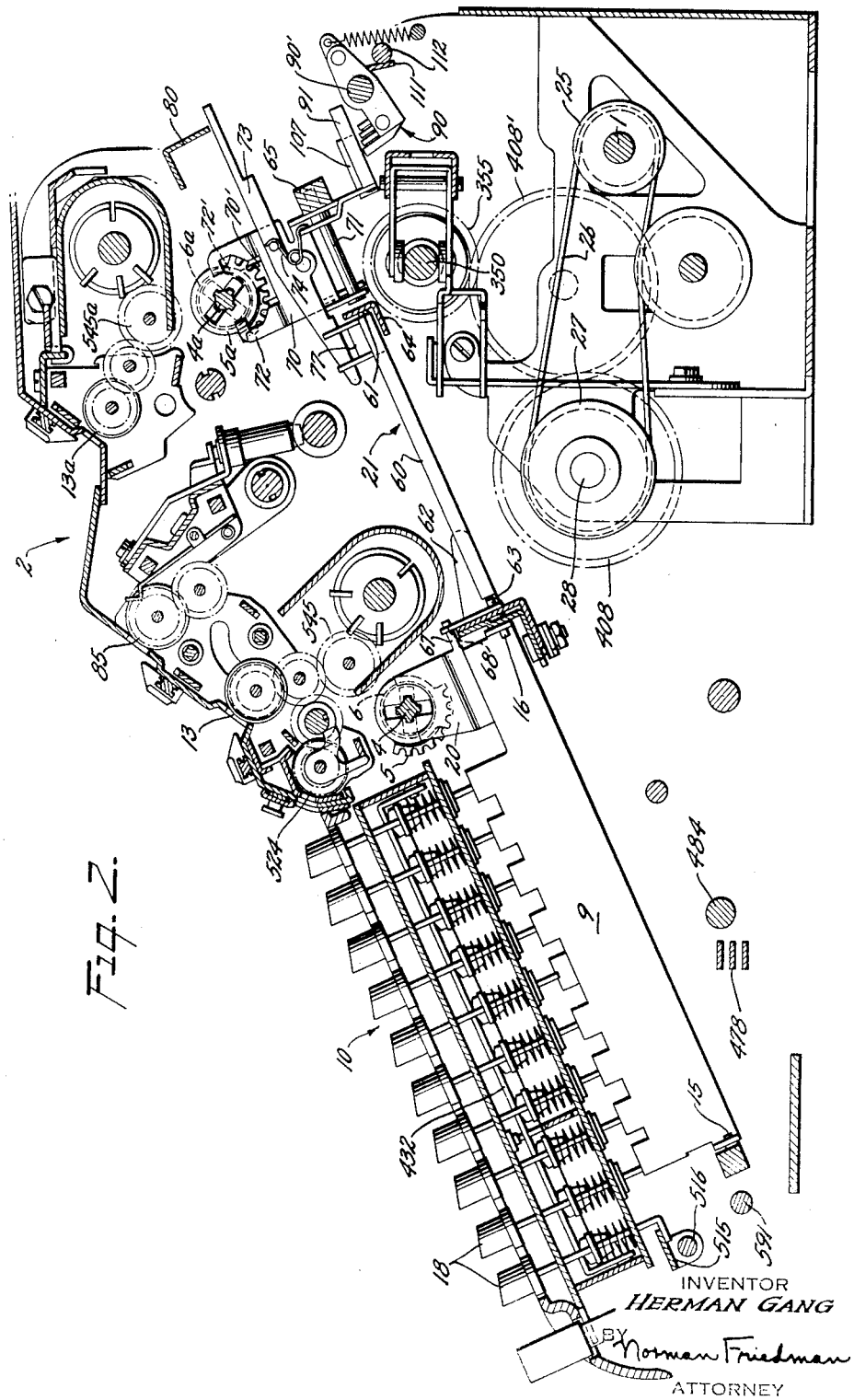
Fig. 2 is a vertical longitudinal section taken through the keyboard.

Referring now to the drawings and noting particularly Figs. 1 and 2 thereof, it will be seen that the machine includes the usual keyboard 10 and a carriage assembly 2 transversely shiftable relative thereto. Mounted in the carriage assembly 2 are two accumulator registers comprising numeral wheels 13 and 13a respectively, a counter register comprising numeral wheels 85, and a multiplier storage register comprising wheels 524.

*Selection and actuating mechanism*

Each of the two accumulator registers is provided with conventional differential actuating value entry mechanism (of the type disclosed in Patent No. 1,399,652 issued to E. E. Phinney on December 6, 1921) in the form of an ordinarily arranged series of differential actuating gears 5 and 5a respectively, slidably splined on actuator shafts 4 and 4a. The actuating gear for each accumulator wheel comprises a pair of independent gear segments, the right segment having four stepped teeth for entering the values 1 through 4 and the left segment having five teeth on a different sector for entering a value of 5. The two segments of each such pair are normally urged away from each other on their actuator shaft to positions on opposite sides of the plane of an intermediate gear 545, 545a of the actuating gear train to the numeral wheels by suitable coil springs 6, 6a mounted on the respective shafts.

Common selection mechanism is provided which, in normal operation of the machine, effects like digital value adjustment of corresponding front and rear actuator gears 5 and 5a. The selection mechanism comprises differentially settable selector bails 9, each order of the machine including two bails, i.e., one for each of the two actuator gear segments of a register order. The selector bails 9 are pivotally mounted in the machine framing at their opposite ends at 15 and 16 for transverse rocking setting movement, and have operating connections 20, 21 respectively with differential actuators 5 and 5a to differentially laterally shift said actuators into the plane of their associated intermediate gears for meshing engagement therewith and thereby digitally adjust said actuators in accordance with values set in keyboard 10 by value keys 18. Connections 20 are mounted fast on selector bails 9 as is conventional, to maintain actuators 5 at all times under the digital control of said bails. However, according to the present invention, connections 21 between the rear actuators 5a and the bails 9, as will be described subsequently in detail, normally couple the rear actuators to the bails for setting thereby but are adjustable to divorce the rear actuators from the bails. This is in contrast with the arrangement in prior art devices wherein the actuators of both registers are always under the control of the selector bails and therefore are invariably digitally adjusted in accordance with the setting thereof.

The power for operating the actuating means is taken from the drive shaft of an electric motor 1 (Figs. 2, 3, 12) which, by means of a belt and pulley connection 25, 26, 27, drives the input shaft 28 of a reversible differential gear drive (Fig. 3) constructed as described in Patent No. 1,566,650. The driving elements of a conventional friction clutch (constructed as disclosed in Patent No. 2,419,760 issued to E. F. Britten, Jr. on April 29, 1947, and the aforementioned Patent No. 2,531,207) are connected to the output gear 408 of the differential gear drive by means of an idler gear 408' and a gear 355 secured to the driving member of the clutch. Shaft 350, which is driven through the friction clutch, drives the actuator shaft 4 for register 13 through a gear train comprising gear 407' fast on shaft 350, double gear 407, and gears 406, 405, 404, 403.

The actuators 5a of register 13a are adapted to be driven at a one to one ratio with the actuators 5 to provide for simultaneous registration in registers 13 and 13a, control means being provided whereby, selectively, the registration in register 13a will be like or unlike in sign (i.e., positive or negative respectively) relative to register 13. The control means is also adjustable to a third condition where no registration will be effected in register 13a even though values are entered into register 13. The control means includes a manually operable key 30 (Figs. 1, 12) settable to forward, rear, and middle positions corresponding respectively to the above mentioned conditions. The stem of key 30 is pivoted at 31 in the machine framing and is connected at its lower end to the front of a link 32 which extends to the rear of the machine where it is provided with a longitudinal slot 32a by which it is supported on a fixed stud 33. At its rear end, link 32 is formed with a slot 34 comprising a series of three vertically stepped slot portions interconnected by inclined cam surface portions. A shifting yoke 35 (Figs. 5–8) pivotally mounted on a fixed stud 36 at the rear of the machine includes a horizontal extension 35a the end of which is closely received within slot 34. It will be seen that when key 30 is shifted to any one of its three positions, a corresponding vertical step of slot 34 will be aligned with extension 35a whereby yoke 35 will assume any one of three angular positions depending on the setting of key 30. Thus, as shown in Figs. 5, 6, and 12, key 30 is in middle or neutral setting wherein the central step of slot 34 receives extension 35a and causes yoke 35 to lie vertically. Movement of key 30 to its forward setting will move link 32 rearwardly whereby the cam surfaces of slot 34 move extension 35a downward to be received within the forward, lowest step of slot 34, rocking yoke 35 on pin 36 to counterclockwise position (Fig. 7). Similarly, adjustment of key 30 to its rear setting will rock yoke 35 to clockwise position (Fig. 8).

The angular position of yoke 35 controls the drive means of the actuators 5a for register 13a as follows. The arms of yoke 35 extend into an annular groove of a collar 37 slidably splined on a sleeve 38 which is in turn mounted fast on the rear actuator shaft 4a, whereby the position of collar 37 on sleeve 38 is determined by the angular position of the yoke, the collar at all times being in driving relation with shaft 4a. Collar 37, which serves to drive actuator shaft 4a through sleeve 38, is provided with lateral oppositely extending teeth 40, 41 adapted to be selectively meshed in driven relation with corresponding recesses formed in the hubs of gears 42, 43 both of which are loosely mounted on sleeve 38 on either side of collar 37. Double gear 407, which as stated previously drives actuator shaft 4, drives gears 42 and 43 in opposite directions relative to each other at a one to one ratio with actuator shaft 4, gear 43 meshing directly with portion 407a of the double gear while gear 42 is driven through an interposed wide idler gear 44 meshing with portion 407b of the double gear. It will be apparent from inspection of Figs. 5 and 12 that gear 42 turns in the same direction as actuator shaft 4, while gear 43 turns in the reverse direction. Thus, when collar 37 is meshed with the hub of gear 42 in response to forward setting of key 30 and counterclockwise positioning of yoke 35, like registration will be effected in registers 13 and 13a when the machine is operated (Fig. 7); conversely, unlike registration is effected by rearward setting of key 30 to cause collar 37 to mesh with gear 43 (Fig. 8); and lastly, no registration will be effected in register 13a when key 30 is in middle setting and thus positions collar 37 vertically between gears 42 and 43 out of engagement with both said gears (Fig. 6).

*Resetting mechanism*

The machine is provided with conventional mechanism operable to effect clearing of the keyboard and therefore of the selector bails and actuator gears, constructed as described in detail in my Patent 2,531,206 issued November 21, 1950. Such mechanism includes a key 466 (Figs. 1, 4) whose stem is connected to the forward end of a pivoted lever 470 provided with a depending arm terminating in a finger 470' adapted to contact an arm of a bell crank 474 connected to the right end of a slide 478 which extends across the machine. Manual depression of key 466 will rock lever 470 clockwise, shifting slide 478 to the left. Leftward movement of slide 478 unlatches a slide 480 for forward movement under the urge of a suitable spring, thereby rocking shaft 486 counterclockwise through arm 485 pivoted to the rear end of slide 480, and thus removing detent 487 fast on shaft 486 from engagement with the driven member of a one-cycle clear clutch 464 whereby the drive to the motor is engaged. The driving member of clutch 464 is driven directly from the motor 1 through gear train 50, 51, 52, 53 (Figs. 3, 4). Engagement of the clear-out clutch 464 is accompanied by closing of the circuit breaker 54 to the electric motor 1 by means of a stud 55 fixed to slide 480 and received in a cam slot of a member 56 fulcrumed in the machine framing. When slide 480 is unlatched to move forwardly its rear portion rises by virtue of the pivotal connection to arm 485, thereby rocking lever 56 counterclockwise to lift a roller 57 to close circuit breaker 54. Clutch 464 thereupon makes one cycle of operation and is disengaged at the end of the cycle by engagement of a pin 493 secured to the driven member of the clutch with the cam face 492' of an arm 492 rigid with detent 487, whereby the detent is rocked clockwise to engage the pawl of the clutch and disconnect the drive when the clutch reaches full cycle position.

Clutch 464, during its single cycle of operation, provides the power to operate a rock shaft 484 (Figs. 3, 4) which extends across the machine. An eccentric cam 495 rotated with the driven member of clutch 464 is adapted to impart reciprocatory movement to a link 496 which is pivoted at its forward end to a crank arm 497 fast on shaft 484. Thus, when clutch 464 is operated, shaft 484 is rocked clockwise during the first half of the cycle and rocked back to normal during the second half of the cycle.

The rocking of shaft 484 serves to effect clearing of the keyboard as follows. The keyboard construction is of the well-known type in which a set key 18 in any order is latched in depressed position by a bail 432 (Fig. 2), and in which the depression of any other key in that order will move the bail to release the set key, the key which is now depressed being in turn latched in set position by the bail. Accordingly, provision is made to simultaneously depress the first row of keys 18 extending across the front of the keyboard, one being provided for each order. Depression of these keys 18, which designate a zero value, serves only to rock the bails 432, thereby releasing the set keys in each order thus allowing the actuators 5, 5a and the setting bails 9 to return to normal under the urge of springs 6, 6a and thus remove values which may be set up on said actuators. However, according to the present invention, as will be discussed later in detail, values set up on actuators 5a will not be removed if connections 21 have been adjusted to uncouple said actuators 5a from the control of bails 9 and said actuators have been locked at their given digital setting.

The stem of each of the zero keys 18 terminates in a horizontally disposed portion. Extending across the machine is a bail 515 (Figs. 2, 4) loosely pivoted on a shaft 516. The rearward edge of bail 515 overlies the horizontal ends of the zero keys 18 and is in contact therewith when said keys are in released position. Thus, when bail 515 is rocked clockwise in Fig. 2 (counterclockwise in Fig. 4), the zero keys 18 will be depressed thereby releasing the value keys which have been set in the keyboard.

Bail 515 is adapted to be operated by rock shaft 484 as follows. A push link 518 pivoted at its forward end to a depending arm of bail 515 is provided at its rear with a laterally extending bolt 519. A member 521 is mounted on shaft 484 for rotation therewith and is slidable along said shaft. Normally, member 521 is located to the right of bolt 519. Slide 478 is provided at its right end with a lug 478a formed with a rearwardly opening slot in which a portion of member 521 is received. Accordingly, when slide 478 is shifted to the left in response to depression of the keyboard clear key 466 as described previously, member 521 will likewise be shifted to the left along shaft 484 and brought into alignment with the head of bolt 519 thereby placing shaft 484 in driving relation with bail 515. Subsequent rocking movement imparted to shaft 484 from clutch 464 through eccentric cam 495 and linkage 496, 497 in the clearout cycle will consequently be effective to rock bail 515 through member 521 and push link 518. Bail 515 is thus rocked clockwise (Fig. 2) in the first half of the cycle to effect resetting of the keyboard and selection mechanism, and thereafter permitted to return to normal position during the second half of the cycle.

*Rear actuator selection control mechanism*

(General Discussion)

According to the present invention, mechanism is provided whereby the rear actuators 5a are adapted to be locked at any given digital value which has been set therein by operation of the keyboard, and the selection mechanism divorced from the rear actuators and reset to zero. Thereafter any new values can be set in the keyboard (and thereby into the front actuators 5). In this regard, it will be recalled that the front actuators 5 are always under the control of the keyboard and selector bails 9. Thus, the rear actuators will be set at one value while the front actuators are set at some other value. The setting of such different values into the front and rear actuators accordingly permits a plurality of calculating operations to be performed simultaneously on the machine.

For example, consider the problem $a \times b/c$. Using the prior art machine of Patent No. 2,617,594, the problem would have to be set up as two different multicyclic operations, namely, a multiplication and a division, performed separately in sequence. With a machine in accordance with the present invention, $a$ can be set up on the rear actuators 5a, $b$ thereafter set up in the front register 13 as a dividend, $c$ then set up through the selection mechanism as a divisor in the front actuators 5, and sign control key 30 set for unlike registration in the front and rear registers. A program of division is then initiated in which the quotient $b/c$ will be registered in the counter register 85 by the subtract, add, shift method as the number of subtractive cycles of actuators 5 up to an overdraft in each order. Since the machine will cycle a given number of times in each order equal to the quotient digit, and register 13a has been adjusted to register unlike in sign relative to register 13, the product of $a$ and $b/c$ will be calculated in register 13a simultaneously with the performance of the division program $b/c$. In this regard, it will be recalled that so long as sign control key 30 is in other than neutral setting, registering operation of the machine of necessity drives both sets of actuators 5, 5a since the drive gear trains to both said actuators are driven in common from double gear 407.

With reference to problems of the nature of $a \times b$, $a \times c$, the invention readily lends itself to the solution of both multiplications in a single programs of multiplication. Thus, the common multiplier $a$ can be introduced into the multiplier storage register 524, the first multiplicand $b$ set up in the rear actuators 5a, and the second multiplicand $c$ thereafter set up in the front actuators 5. Sign control key 30 is adjusted for like registration in registers 13 and 13a, and a program of multiplication initiated. The product $a \times c$ will of course be registered in numeral wheels 13 as usual, while the product $a \times b$ will simultaneously be registered in rear register 13a. This is so since the machine will cycle for registration in each order a number of times equal to the corresponding multiplier digit.

*Rear actuator selector connections*

It will be recalled that each actuator gear (5, 5a) is composed of two differentially settable mutilated gears, the gear segments of the forward actuators 5 being invariably adjusted in accordance with the setting of their associated selectors 9 by connections 20 as is conventional. According to the present invention, however, the connection 21 between each rear actuator gear segment and the associated selector bail 9 is adjustable so that the gear segment can selectively be divorced from the control of the bail or brought under the control thereof.

Referring to Figs. 2 and 9, the latter figure showing the pair of selector connections 21 for the two rear actuator gear segments of a single order, each connection 21 includes a longitudinally extending bar 60 terminating in a rear cylindrical shaft portion 61. A right angle bracket 62 secured to the front end of bar 60 serves to pivotally mount said bar in the machine framing at 63, while shaft portion 61 is journalled for rotation in a fixed framing plate 64. A rearwardly extending tongue 67 of connection 20 is closely received within an upwardly opening slot 68 of bracket 62 whereby bar 60 and bail 9 are linked together for like transverse digital rocking movement in response to depression of the value keys 18.

The two connector bars 60 of each order are adapted to be coupled in operative relation with their respective four and five toothed actuator gear segments by means of gates 70 and 70' which are loosely mounted for rotation on corresponding fixed shafts 71 by depending apertured tails integral with said gates. The shafts 71 are aligned with the related bars 60 and are rigidly mounted on a fixed transverse member 65. The gates 70, 70' are formed at their upper ends with forked portions 72, 72' respectively, each of which engages the outer side face of the corresponding actuator gear segment to effect lateral digital setting of said segment along shaft 4a. A coupling lever 73 pivoted intermediate its ends on each gate is normally urged counterclockwise by a spring 74 into engagement with central recesses 75 of aligned V-slots 76 formed in members 77 fast on bar 60. With fingers 73 so disposed in counterclockwise coupling position it will be seen that transverse rocking movement imparted to selector bails 9 and connector bars 60 by depression of value keys 18 will be imparted to gates 70, 70' to thereby effect corresponding digital adjustment of the rear actuator gears 5a.

The coupling levers 73 are adapted to be swung clockwise out of slots 76 against the urge of springs 74 by a bail 80 which extends across the machine above the tails of levers 73. Bail 80 is provided at its opposite ends with forwardly extending arms 81 (see also Fig. 13) by which it is rotatably mounted on a fixed shaft 82. The bail 80 is normally maintained elevated in ineffective counterclockwise position but is adapted to be rocked clockwise downwardly about shaft 82 and thereby engage the tails of coupling levers 73 to swing said levers clockwise out of V-slots 76 whereby gates 70, 70' and gears 5a are effectively divorced from the control of connector bars 60 and selector bails 9. The operating mechanism which serves to effect downward clockwise movement of bail 80 will be described subsequently.

Rear actuator locking means

As described previously, the two actuator gear segments of each order are adapted to assume various digitally adjusted positions in response to rocking setting movement of shifting gates 70 and 70', said gates being rocked by connector bars 60 (upon depression of value keys 18) when coupled thereto by coupling levers 73. Gate 70 and its associated stepped four-tooth actuator gear segment can assume any one of four digital positions corresponding to values of 1 through 4 inclusive, while gate 70' and its associated five-tooth actuator gear segment can assume one setting of digital adjustment corresponding to a value of 5.

The means whereby the rear actuators 5a can selectively be locked at any digital setting thereof will now be described. While any suitable locking means can be employed, I have found the hereinafter described mechanism most suitable and practical for this purpose. The locking means for each right-hand four toothed actuator segment comprises a locking unit 90 loosely pivoted on a transverse shaft 90' which extends across the machine. Each locking unit 90 is disposed below and is adapted to cooperate with a rearwardly extending bar 91 fast with a depending tail of gate 70. Each such unit 90 comprises an assembly of four plates 92, 93, 94, 95 rigidly joined together in side by side relation, each plate being formed with an integral forward upstanding blocking finger 96, 97, 98, 99 respectively. The four fingers 96 through 99 of locking unit 90 are arranged with each finger disposed to the right and rear of the preceding finger, said fingers being of successively decreasing height from front to rear. In normal unset or zero position of each shifting gate 70 (Fig. 10), the lower left longitudinal corner edge of its bar 91 is substantially in vertical alignment with the left side of finger 96. When gate 70 has been rockably set to any of its four digital positions corresponding to values of 1 through 4 in response to depression of the value keys 18, the above mentioned corner edge of bar 91 will be disposed above and slightly to the right of a corresponding one of the fingers 96–99.

The locking mechanism for the left-hand gate 70' of each order is essentially similar to the mechanism described above and comprises a single plate 105 loosely pivoted on shaft 90' and formed with a forward upstanding locking finger 106 disposed below and adapted to cooperate with rearward extension 107 provided at the bottom of said gate 70'. In normal, unset position of gate 70', extension 107 thereof is substantially vertically aligned with finger 106 as shown in Fig. 10; when gate 70' is rocked clockwise for its digital setting of 5, extension 107 will have been shifted slightly to the left of finger 106.

The various ordinal locking units 90 and 105 are spring-urged clockwise (Figs. 2, 9) but are normally maintained in counterclockwise ineffective position with the locking fingers 96–99 and 106 below and out of the range of shifting gates 70, 70' by a bail 111 which extends across the machine below said units 90, 105 and is secured to a rock shaft 112. Suitable operating mechanism is provided which, as will be described in the following section, when operated rocks shaft 112 and bail 111 clockwise thereby permitting locking units 90 and 105 to swing clockwise under their spring urge, whereby the aforesaid locking fingers can now function to lock gates 70 and 70' in any differentially adjusted position thereof. Referring to Fig. 11, gates 70 and 70' are shown in differentially rocked position corresponding to a value of 6, i.e., right-hand gate 70 has been rocked counterclockwise one increment of movement to a value of 1, while left-hand gate 70 has been rocked clockwise its single increment of movement to a value of 5. The associated actuator gear segments are of course adjusted to these same digital settings against the urge of coil spring 6a by the upper bifurcated portions 72, 72' of the gates. Upon enablement of locking units 90 and 105 by clockwise rocking of shaft 112 and bail 111, said locking units are spring-urged clockwise whereby the fingers of said units move upward into locking engagement with their associated gates 70, 70'. Thus, in Fig. 11, the upper end of finger 97 has engaged the underside of bar 91 while finger 96 is disposed to the left and in the path of bar 91 thereby blocking gate 70, and hence the related four-toothed actuator gear segment, against return movement to zero position. In like fashion, gate 70 is adapted to be locked in any other of its differentially set positions for values of 2, 3 and 4 by fingers 97, 98, and 99 respectively. It may be noted at this juncture that the left side face of bar 91 is inclined so as to provide undercut clearance at the portion of said bar which is to be blockingly engaged by the locking fingers 96–99. With reference to gate 70', said gate when adjusted clockwise to a value of 5 as in Fig. 11 has its lower extension 107 disposed to the left of locking finger 106 whereby said finger when released can move vertically to effective locking position to the right and in the path of return normalizing movement of the gate. Accordingly, gate 70' and the associated five-toothed actuator gear segment are thereby locked in digitally adjusted position by finger 106.

As indicated in the preceding description, the locking fingers of locking units 90 and 105 are effective, upon clockwise rocking of shaft 112 and bail 111, to lock the pair of gates 70, 70' (and consequently the related segments of actuator gears 5a) in any digital position to which said gates and gears have been differentially adjusted by selector bails 9 acting through connector bars 60. Therefore, when the gates are subsequently divorced from the bars 60 by clockwise movement of coupling levers 73, the rear actuator gears 5a will be held at their digital setting against the outwardly directed normalizing urge exerted by the compression spring 6a which is interposed between the two laterally movable gear segments comprising each of said actuator gears.

The provision of the locking elements as separate fingers is particularly advantageous since it permits individual lateral adjustment of said fingers to compensate for slight variations in setting movement among the various orders of the machine.

*Operating mechanism*

Operating mechanism is provided whereby the locking units 90 and 105 are enabled for effective operation and the coupling levers 73 then swung clockwise to divorce the locked gates 70, 70' and rear actuators 5a from the control of the selector bails 9. The selection mechanism is then cleared and can thereafter be employed to set new values into the front actuators 5. In the preferred form of the invention as herein described, the above-described locking and divorcing operations are effected by initiating a keyboard clearout cycle which will cause clearing of keys 18 and therefore normalizing of selector bails 9 and front actuators 5. During the clearout cycle but before clearing has been effected, power is taken from a portion of the clearout mechanism to rock bails 111 and 80 clockwise in sequence to lock gates 70, 70' and the associated actuator gear segments in digitally set position, and divorce them from the selection mechanism. Clearing of the keyboard then takes place, whereby upon completion of the cycle new values can be entered into the front actuators 5 through the keyboard.

The operating mechanism is selectively operated by a control key 120 manually movable from a rear inactive position (Figs. 1, 4, 12) to a forward active position (Fig. 13). The stem of key 120 is pivoted to the machine framing at its lower end, and is pivoted at its upper portion to the front end of a plate 121 formed with a rearwardly opening slot by which the plate is supported for forward movement on a fixed stud 122. A member 123 pivoted to plate 121 at 124 is spring urged counterclockwise into engagement with a stud 125 of plate 121. As plate 121 is moved forwardly in response to forward movement of key 120, the forward vertical edge of a depending ear 123a of member 123 will engage a lateral pin 127 of lever 470 and thereby rock said lever counterclockwise in Fig. 12 (clockwise in Fig. 4). It will be recalled that such movement of lever 470 is effective to initiate a keyboard clearout cycle during which shaft 484 rocks counterclockwise in the first half of the cycle and then returns clockwise to normal position. An elongated crank arm 130 is provided fast on shaft 484 for rocking movement therewith. Said crank 130 normally rocks idly forward and returns with shaft 484 during each resetting cycle. However, the initial forward movement of key 120, before the key is effective to rock lever 470 to initiate the keyboard clearout cycle, serves to condition the mechanism of the invention for effective operation by crank 130.

A link 131 pivoted at its rear to a depending arm 132 fast on shaft 112 is formed at its forward portion with an elongated longitudinal slot 133 in which is received a pin 134 of crank 130. A heavy spring 135 secured at its opposite ends to pin 134 and a pin 136 on link 131 serves to connect crank 130 in forward driving relation with said link, spring 135 being prevented from buckling downward by a pin 137 secured to link 131. A shoe 140 pivoted at 141 to crank 130 is urged clockwise by a spring 142 attached to the lower end of crank 130 into engagement with the forward end of link 131 by a spring 142 attached to the lower end of the crank. During each resetting cycle, shaft 484 and crank 130 will rock counterclockwise during the first half-cycle to the full line position of Fig. 13, during which movement spring 135 urges link 131 forwardly causing arm 132 to rock shaft 112 and bail 111 clockwise and thereby release locking units 90 and 105 for clockwise locking movement as described previously. If the resetting cycle has been initiated other than by key 120, as for example by operation of the keyboard clear key 466, the return stroke of shaft 484 and crank 130 in the second half of the cycle will merely return the parts to their normal unoperated position of Fig. 12, link 131 being restored rearwardly during said second half-cycle by shoe 140 under the clockwise urge of spring 142.

As will now be described, however, if the resetting cycle has been initiated in response to operation of key 120, bail 80 will be rocked clockwise toward the end of the first half-cycle to divorce gates 70, 70' from connector bars 60 while shaft 112 is in clockwise position, the clockwise positioning of bail 80 serving to maintain shaft 112 locked in operated position by interposition of a depending arm 150 of said bail in the path of return movement of an upstanding arm 151 fast with shaft 112. Said arm 151 is normally disposed substantially horizontally (Fig. 12), but is rocked to vertical position upon clockwise operation of shaft 112.

A member 155 is formed at its front end with a longitudinal slot 156 by which it is connected to a pin 157 on the stem of key 120. At its read end, member 155 has pivot connection with the center of a normally broken toggle 158 which comprises pivotally connected links 158a, 158b urged together by a spring 158c. The lower end of link 158a is rotatably mounted in the machine framing while the upper end of link 158b is pivoted to a depending arm of a bell crank 160 journalled in the framing. The rear arm of bell crank 160 has link connection 161 with a forwardly extending ear of divorcing bail 80. As mentioned previously, bail 80 includes a depending arm 150 which is adapted to cooperate with arm 151 of shaft 112 to lock said shaft in clockwise operated position. In normal counterclockwise position of bail 80 (Fig. 12), the lower end of arm 150 is located above and out of the clockwise path of arm 151 whereby said shaft 112 can be rocked clockwise during the forward stroke of crank arm 130 and clear shaft 484.

In response to operation of key 120, member 155 is caused to move forwardly to set toggle 158 after shaft 112 and arm 151 have been rotated clockwise to operated position. The setting of the toggle rocks bell crank 160 clockwise thereby rocking bail 80 downwardly about shaft 82 as an axis to effect divorcing of the rear actuators 5a from the selection mechanism as discussed earlier. In the downwardly rocked position of bail 80, its depending arm 150 will be blockingly disposed immediately in front of arm 151 of shaft 112 (Fig. 13) thereby maintaining shaft 112 in operated position. Bail 80 will be held in operated position by virtue of the set condition of toggle 158.

The arrangement whereby member 155 is caused to move forwardly to set toggle 158 upon movement of key 120 to forward active position will now be described. A slot 165 formed in a central projection of member 155 serves to mount the member for forward movement on a stud 166 secured in the machine framing. A pin 167 secured to member 155 for movement along a vertical slot 168 of the latter lies in the vertical plane of movement of crank 130 but is normally maintained at the upper limit of slot 168 slightly above and out of the path of said crank by a spring 169. The initial forward movement of key 120 serves to condition pin 167 to be engaged by crank 130 in the forward stroke of the latter by moving said pin down into the path of said crank as follows. A bar 175 is pivotally supported at its front end on pin 157 which, it will be recalled, supports the forward portion of member 155. The rear, vertically offset arm 175a of bar 175 is horizontally slotted at 176 to support said bar on a pin 177 secured to member 155. An arm 178 fulcrumed to member 155 rests on a roller 179 secured to pin 167, said arm including a rear cam surface 178a adapted to be engaged by a nose 180 of bar 175. The first portion of forward movement of key 120 will move bar 175 toward the front of the machine whereby nose 180 engages cam surface 178a and rocks arm 178 counterclockwise, thus moving pin 167 downward against the urge of spring 169 into the path of crank arm 130.

The final portion of the forward operational movement of key 120 will be effective to initiate a keyboard clearout cycle by rocking lever 470 through plate 121 and member 123 as described previously. In the forward stroke of shaft 484 and crank arm 130 during the first half of the clearout cycle, said crank arm will: (1) first rock shaft 112 (and bail 111) clockwise through spring 135 and link 131 thereby releasing locking units 90 and 105 for effective operation; and (2) then engage the depressed pin 167 thereby moving lever 155 forwardly to set toggle 158 and thus rock bail 80 downward, whereby coupling levers 73 are rocked clockwise to divorce the rear actuators 5a from the selection mechanism, and depending arm 150 of bail 80 is disposed in forward blocking relation relative to arm 151 of shaft 112. The first half-cycle concludes with clearing of the keyboard by operation of bail 515 as described earlier. The position of the parts at the end of the first half of the keyboard clearout cycle is shown in full lines in Fig. 13. In the second half of the cycle, crank arm 130 will be restored rearwardly to normal position by shaft 484, toggle 158 serving to maintain lever 155, bail 80, and therefore shaft 112 in operated position. Because of the pin and slot connection 133, 134 between crank 130 and link 131, the return stroke of the crank will operate to lower said link about its pivot on arm 132 (the latter being fast with shaft 112), thereby rotating shoe 140 counterclockwise, the final position of crank 130, link 131, and shoe 140 being shown in dot-dash lines in Fig. 13.

From the foregoing it will therefore be seen that operation of key 120—after a value has been set in the selection and actuating mechanism by depression of the value keys 18—will be effective to lock the rear actuators 5a at their digitally set position, divorce said actuators 5a from the selection mechanism, and finally clear the selection mechanism. Since the front actuators 5 always remain under the control of the selection mechanism, new values can thereafter be introduced into the front register 13 and set into the front actuators through the keyboard to control subsequent machine operations.

As indicated earlier, two possible applications of the invention are in the simultaneous calculation of $a \times b/c$ or $a \times b$, $a \times c$. In calculating $a \times b/c$, $a$ is set in keys 18 and key 120 operated to lock the value into the rear actuators 5a, divorce said actuators from the selection mechanism, and clear the keyboard. The value $b$ is then set upon the keyboard and entered into register 13 by depression of the dividend entry key 468. The divisor is then set up on the keyboard and a program of division initiated by depression of divide key 590, with sign control key 30 set to its rear position for unlike registration. The quotient $b/c$ will appear in the counter dials 85, and the product $a \times b/c$ will appear in register 13a.

With reference to the simultaneous multiplication $a \times b$, $a \times c$, the common multiplier $a$ is entered into the multiplier storage register 524 through the keyboard by depression of the multiplier entry key 526. The multiplicand $b$ is then set up in the keyboard and locked in the rear actuators 5a by operation of key 120, the multiplicand $c$ thereafter being set up in the front actuators 5 through the keyboard which has been cleared in response to operation of key 120. With sign control key 30 adjusted for like registration in registers 13 and 13a, a program of multiplication is initiated by depression of multiply key 587. The product $a \times b$ will appear in register 13a, and the product $a \times c$ will appear in register 13.

Other applications of the invention will be apparent to those skilled in the art.

Normalizing

It will be recalled that the mechanism of the invention is maintained in the operated position of Fig. 13 by virtue of the set condition of toggle 158. Whenever desired, the mechanism can be restored to normal, unoperated position (Fig. 12) by moving member 155 to the rear to break toggle 158 and consequently rock bail 80 counterclockwise to permit coupling fingers 73 to be urged counterclockwise by springs 74 into engagement with the walls of V-slots 76. The counterclockwise normalizing movement of bail 80 serves to remove arm 150 upwardly from blocking engagement with arm 151 of shaft 112, thereby permitting link 131 to restore said shaft 112 counterclockwise under the rearwardly directed resilient urge of shoe 140, whereby bail 111 on said shaft swings locking units 90 and 105 counterclockwise downwardly out of locking engagement with gates 70, 70'. The coil spring 6a disposed between the two actuator gear segments of each actuator 5a accordingly restores said segments and the associated gates 70, 70', the forward noses of coupling levers 73 being guided to the central recesses 75 of V-slots 74 by the sloping side walls of said V-slots whereby the gates and actuator segments will be recoupled to connector bars 60 in angular position corresponding to the position of selectors bails 9.

It will be apparent that rearward restoring movement of member 155 to effect the above-described normalizing operations can be effected by manually returning key 120 from its forward operated position to rear inactive position. In this regard, it will be noted that in the forward operated position of member 155, the rear wall of slot 156 of the slot and pin connection 156, 157 (between member 155 and key 120) is disposed adjacent said pin 157. Therefore, as key 120 is returned rearwardly, pin 157 will engage the rear wall of slot 156 and shift member 155 in like direction to break toggle 158.

In addition, I provide selectively operable means to effect a rearward normalizing shift of member 155 in response to termination of a subsequent program of multiplication or division. For this purpose, a lever 185 (Fig. 14) pivoted to member 155 is urged clockwise by a spring 185a into engagement with a pin 186 mounted on one arm of a Y-member 187 which is also pivoted to member 155 and is provided with additional pins 188, 189. A spring 190 urges Y-member 187 counterclockwise so that pin 188 is normally seated in a semicircular recess formed in the upper edge of member 155, whereby Y-member 187 and lever 185 normally assume respective clockwise and counterclockwise positions as shown in Figs. 12 and 13.

With reference to automatic normalizing after multiplication, the multiplication control mechanism includes a shaft 591 which—as disclosed in Patent No. 2,531,207—is rocked counterclockwise upon initiation of a program of multiplication and is then restored clockwise to normal position at the conclusion of said program. An arm 195 is mounted fast on shaft 591 for rocking movement therewith. Upon initiation of a multiplication program with member 155 in forward operated position (Fig. 13), arm 195 will rock past pin 189 (Fig. 14) and in so doing its upper end will engage said pin and swing Y-member 187 clockwise against the urge of spring 190, the Y-member being restored to normal counterclockwise position by the spring when arm 195 has moved past pin 189. Arm 195 will thus be in driving relation with pin 189 and will therefore act to shift member 155 to the rear through Y-member 187 to break toggle 158 upon clockwise return movement of shaft 591 at the end of the multiplication program.

With reference to automatic normalizing after division, the division control mechanism includes a shaft 616 which is rocked counterclockwise at the beginning of a division program and is then restored clockwise to normal position at the end of the program as disclosed in the aforementioned Patent No. 2,531,207. An arm 196 secured to shaft 616 will, when rocked forwardly with said shaft, cammingly engage the rear hooked end 197 of lever 185 and swing the lever counterclockwise against the urge of spring 185a. Arm 196 will continue to move forwardly to its operated position clear of hook 197 permitting said hook to drop behind arm 196 to driven relation therewith. Accordingly, at the termination of the division program arm 196 will return to normal position thereby shifting lever 185 and member 155 to the rear to break toggle 158.

Means is provided to selectively disable the above-described automatic normalizing mechanism by removing pin 189 and hook 197 from the path of movement of the respective rock arms 195 and 196 as follows. A key 200 (Figs. 1, 12, 14) pivoted in the machine framing at 201 terminates in a lower horizontal projection 202. When key 200 is set to forward active position (Fig. 14), projection 202 thereof will have been raised to engage pin 188 of Y-member 187 and rock the Y-member clockwise, the latter in turn rocking lever 185 counterclockwise through pin 186. Consequently, pin 189 and hook 197 are disposed above and out of the path of movement of the respective multiplication and division normalizing arms 195 and 196, whereby operation of said arms is ineffective to bring about a normalizing operation. From the foregoing it will be seen that disablement of the automatic normalizing mechanism by setting key 200 to its forward position will permit the rear actuators 5a to remain divorced and locked at their given digital setting for as long as the operator of the machine may desire throughout a series of calculating programs including multiplication and/or division.

Modified locking means

Figs. 15 through 18 show a modified form of locking means for the rear actuators which may be used as an alternative to the previously described arrangement employing locking units 90, 105. In the modified form, each ordinal pair of setting gates 70, 70' is adapted to be locked in differentially adjusted angular position by a U-member 205 provided with a facing 206 of high-friction material such as cork. The ordinal series of members 205 are slidably mounted for forward movement toward the depending tails of gates 70, 70' on fixed transverse shafts 207 and 208, but are normally maintained in rearward ineffective position under the resilient urge of a single elongated coil spring 209 which extends transversely across the machine through said U-members 205. Coil spring 209 is mounted at its opposite ends in fixed vertical plates 213 interconnected by a bar 214 situated immediately in front of the depending tails of gates 70, 70'. A member 215 which extends across the machine is pivoted at 216 to plate 213 and has link connection 217 with the forwardly extending arm 81 which mounts divorcing bail 80 on shaft 82. Transverse member 215 is formed with an ordinal series of upstanding tongues 218 each adapted to engage from behind a portion of coil spring 209 intermediate the two arms of a corresponding U-member 205.

The modified locking means operates as follows. Forward movement of key 120 will be effective to rock divorcing bail 80 downward as described earlier. The initial downward movement of bail 80 before it has performed its divorcing function will rock member 215 counterclockwise about pivot 216. Tongues 218 accordingly engage coil spring 209 and shift U-members 205 forwardly whereby the friction facings 206 thereof are firmly seated against the depending tails of setting gates 70, 70' and thereby lock said gates in their digitally adjusted position. Transverse bar 214 disposed in front of said depending tails acts as a backing plate against the forwardly directed force of U-members 205.

Bail 80 thereupon completes its downward stroke to swing coupling levers 73 clockwise out of V-slots 76 and divorce gates 70, 70' from the selection mechanism in their digitally locked condition. The gates (and the associated rear actuators 5a) will remain so locked and divorced by virtue of the set condition of toggle 158 until normalizing is effected by breaking toggle 158 as described previously. It will be apparent that the modified form of locking means herein-described eliminates the necessity for bail 111, and the various operating mechanism associated therewith.

Many modifications and equivalents within the spirit and scope of the invention will now be apparent in the light of the foregoing disclosure of specific embodiments of the invention. Accordingly, it is intended that the disclosure of such specific embodiments be illustrative only and not limitative of the scope of the following claims.

I claim:

1. In a calculating machine having two registers disposed one behind the other, differentially adjustable value entry means for each of said registers, common digital value selection mechanism for controlling differential operation of both said value entry means, mechanism operable to lock one of said value entry means in digitally adjusted position and then divorce said one value entry means from the control of said common selection mechanism, means for operating said locking and divorcing mechanism, means for restoring said locking and divorcing mechanism to unoperated condition after operation thereof thereby restoring said one value entry means to control by said common selection mechanism, means for selectively initiating operation of said restoring means, and means automatically operable in response to operation of said initiating means to cause said one value entry means to assume the same differential adjustment as said other value entry means.

2. In a calculating machine having two registers disposed one behind the other, and differentially adjustable value entry means for each of said registers; common digital value selection mechanism for controlling differential adjustment of both said value entry means, selectively operable mechanism for locking one of said value entry means in differentially adjusted position and then divorcing said one value entry means from the control of said common selection mechanism, means for operating said locking and divorcing mechanism, means for restoring said locking and divorcing mechanism to unoperated condition after operation thereof thereby restoring said one value entry means to control by said common selection mechanism, and means for initiating operation of said restoring means regardless of the relative digital settings of both said value entry means.

3. In a calculating machine having two registers and differentially adjustable value entry means for each of said registers; common digital value selection mechanism for controlling differential adjustment of both said value entry means, means for locking one of said value entry means in digitally adjusted position and divorcing said one value entry means from the control of said common selection mechanism, means for operating said locking and divorcing means, drive means for operating said operating means, and means including a manually operable key for effecting operation of said drive means.

4. In a calculating machine having two registers and differentially adjustable value entry means for each of said registers; common digital value selection mechanism for controlling differential adjustment of both said value entry means, resetting means for said selection mechanism, means for locking one of said value entry means in digitally adjusted position and divorcing said one value entry means from the control of said selection mechanism, means for operating said locking and divorcing means, and a control device for initiating operation of said operating means and said resetting means.

5. In a calculating machine having two registers and differentially adjustable value entry means for each of said registers; common digital value selection mechanism for controlling differential adjustment of both said value entry means, resetting means for said selection mechanism, means for locking one of said value entry means in digitally adjusted position and divorcing said one value entry means from the control of the selection mechanism, means for initiating operation of said resetting means, means responsive to initiation of a resetting operation by said initiating means for operating said locking and divorcing means to effect locking of said one value entry means prior to resetting of said selection mechanism.

6. In a calculating machine having two registers and differentially adjustable value entry means for each of said registers; common digital value selection mechanism for controlling differential adjustment of both said value entry means, means for locking one of said value entry means in digitally adjusted position and divorcing said one value entry means from the control of the selection mechanism, and means for automatically disabling said locking and divorcing means in response to termination of a calculation program.

7. The invention set forth in claim 6 further comprising control means for selectively enabling and disabling said disabling means.

8. The invention set forth in claim 7, said control means comprising a manually operable key.

9. In a calculating machine having two registers, differentially adjustable value entry means for each of said registers, and multiplication control mechanism for controlling a multiplication program; common digital value selection mechanism for controlling differential adjustment of both said value entry means, means for locking one of said value entry means in digitally adjusted position and divorcing said one value entry means from the control of the selection mechanism, and means for automatically disabling said locking and divorcing means in response to termination of a multiplication program.

10. In a calculating machine having two registers, differentially adjustable value entry means for each of said registers, and division control mechanism for controlling a division program; common digital value selection mechanism for controlling differential adjustment of both said value entry means, means for locking one of said value entry means in digitally adjusted position and divorcing said one value entry means from the control of the selection mechanism, and means for automatically disabling said locking and divorcing means in response to termination of a division program.

11. In a calculating machine having two registers, differentially adjustable value entry means for each of said registers, multiplication control mechanism for controlling a multiplication program, division control mechanism for controlling a division program, and means for controlling the sign of registration of one of said registers relative to the other; common digital value selection mechanism for controlling differential adjustment of both said value entry means, means for locking one of said value entry means in digitally adjusted position and divorcing said one value entry means from the control of the selection mechanism, and means for automatically disabling said locking and divorcing means in response to termination of a program of multiplication or division.

12. In a calculating machine having two registers and differentially adjustable value entry means for each of said registers; common digital value selection mechanism for controlling differential adjustment of both said value entry means, selectively operable mechanism for locking one of said value entry means in differentially adjusted position and divorcing said one value entry means for the control of said common selection mechanism, means for selectively operating said locking and divorcing mechanism, said operating means including a single control device which is effective, when operated, to cause operation of said locking and divorcing mechanism.

13. The invention according to claim 12, said control device comprising a single manually operable key which is effective, when manually operated, to cause operation of said locking and divorcing mechanism.

14. In a calculating machine having two registers and differentially adjustable value entry means for each of said registers; common digital value selection mechanism for controlling differential adjustment of both said value entry means, means for locking one of said value entry means in digitally adjusted position and divorcing said one value entry means from the control of the selection mechanism, and means for automatically disabling said locking and divorcing means in response to termination of a calculation.

References Cited in the file of this patent

UNITED STATES PATENTS

| | | |
|---|---|---|
| 1,075,073 | Trinks | Oct. 7, 1913 |
| 1,118,829 | Trinks | Nov. 24, 1914 |
| 1,510,100 | Odhner | Sept. 30, 1924 |
| 1,793,155 | Britten | Feb. 17, 1931 |

FOREIGN PATENTS

| | | |
|---|---|---|
| 210,660 | Germany | July 14, 1906 |
| 382,046 | Germany | Jan. 29, 1925 |

UNITED STATES PATENT OFFICE

CERTIFICATE OF CORRECTION

Patent No. 2,947,477                                             August 2, 1960

Herman Gang

It is hereby certified that error appears in the printed specification of the above numbered patent requiring correction and that the said Letters Patent should read as corrected below.

Column 6, line 43, for "programs" read -- program --; column 10, line 26, for "read" read -- rear --; column 12, line 26, for "selectors" read -- selector --.

Signed and sealed this 11th day of April 1961.

(SEAL)
Attest:
ERNEST W. SWIDER

Attesting Officer

ARTHUR W. CROCKER
Acting Commissioner of Patents